US011934510B2

(12) United States Patent
Kairali et al.

(10) Patent No.: US 11,934,510 B2
(45) Date of Patent: Mar. 19, 2024

(54) USING DRAWING CAPABILITY AS A CREDENTIAL OR AUTHENTICATION MECHANISM VIA GENERATIVE AND ADVERSARIAL NETWORK

(71) Applicant: International Business Machines Corporation, Armonk, NY (US)

(72) Inventors: Sudheesh S. Kairali, Kozhikode (IN); Ankur Tagra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 17/124,933

(22) Filed: Dec. 17, 2020

(65) Prior Publication Data

US 2022/0197988 A1 Jun. 23, 2022

(51) Int. Cl.

*G06F 21/36* (2013.01)
*G06N 3/045* (2023.01)
*G06N 3/088* (2023.01)

(52) U.S. Cl.

CPC ............. *G06F 21/36* (2013.01); *G06N 3/045* (2023.01); *G06N 3/088* (2013.01); *G06F 2221/2103* (2013.01)

(58) Field of Classification Search

CPC ....................................................... G06F 21/36
See application file for complete search history.

(56) References Cited

U.S. PATENT DOCUMENTS 8,024,775 B2 9/2011 Xu et al.
8,769,669 B2 7/2014 Le et al.
9,295,917 B2 * 3/2016 Gross ...................... A63F 13/61
10,754,936 B1 * 8/2020 Hawes .................. G06F 21/316
2013/0151419 A1 * 6/2013 Hitchcock ............ H04W 12/10 705/26.41
2014/0223547 A1 * 8/2014 Tse ......................... G06F 21/31 726/19

(Continued)

OTHER PUBLICATIONS

Adaloglou, Nikolas, "GANs in computer vision: Introduction to generative learning (part 1)" [online], AI Summer, retrieved on Nov. 24, 2020 from the Internet URL: https://theaisummer.com/gan-computer-vision/ (2020).

(Continued)

*Primary Examiner* — Simon P Kanaan
(74) *Attorney, Agent, or Firm* — L. Jeffrey Kelly

(57) ABSTRACT

A person's drawing capability is used as an authentication credential. During a training phase, a user is asked to hand draw various reference shapes such as a rectangle, flower, etc. These user drawings for a given shape are input to a training discriminator (with an "authentic" label) along with drawings automatically generated from a latent sample (with a "not authentic" label), and the training discriminator computes positive discrimination vectors for this shape that are unique to this user. Thereafter, when the user wants access to a resource (such as an online account, a mobile computing device, or an electronic document), the user is presented with a drawing challenge for one of the reference shapes, and they draw a corresponding challenge image. An image vector for the challenge image is generated, and if the image vector falls within the positive discrimination vectors, access to the resource is granted.

20 Claims, 5 Drawing Sheets

(56) References Cited

U.S. PATENT DOCUMENTS

| | | | | |
|---|---|---|---|---|
| 2015/0170204 | A1* | 6/2015 | Inbar ...................... | G06Q 30/02 705/14.55 |
| 2018/0144116 | A1 | 5/2018 | Li et al. | |

OTHER PUBLICATIONS

Brownlee, Jason, "How to Develop a 1D Generative Adversarial Network From Scratch in Keras" [online], Machine Learning Mastery, retrieved on Nov. 24, 2020 from the Internet URL: https://machinelearningmastery.com/how-to-develop-a-generative-adversarial-network-for-a-1-dimensional-function-from-scratch-in-keras/ (2019).

Islam, Md, et al., "Poster: A Behavioural Authentication System for Mobile Users", Proc. SIGSAC Conf. on Computer and Communications Security, pp. 1742-1744 (2016).

Wikipedia, "Discriminative model" [online], retrieved on Nov. 24, 2020 from the Internet URL: https://en.wikipedia.org/wiki/Discriminative_model (2020).

* cited by examiner

USING DRAWING CAPABILITY AS A CREDENTIAL OR AUTHENTICATION MECHANISM VIA GENERATIVE AND ADVERSARIAL NETWORK

BACKGROUND OF THE INVENTION

Field of the Invention

The present invention generally relates to providing secure access to computer resources such as computer systems or electronic documents, and more particularly to a method of authenticating a user of a system.

Description of the Related Art

Computer system and software designers have devised a variety of security features to restrict access or grant privileges to different aspects of a computer system or to various electronic documents. The most common of these features is a unique user identifier or username which is usually provided in combination with a personal identification number (PIN) or password. This login information allows a user to be authenticated, and then corresponding access controls can be implemented according to the particular systems involved. In more secure systems, there can be extensive password requirements, like a minimum number of characters, requiring at least one numeric character and at least one alphabetical character, requiring both upper- and lower-case alphabetical characters, and requiring special keyboard characters (e.g., punctuation or other symbols).

There can be multiple layers to authentication protocols. For example, systems often employ a standard list of special questions that can be asked of a user ahead of time (e.g., "What is your mother's maiden name?") and the user's answers are stored in a secure fashion, i.e., using cryptography, as part of the user's profile. Then, when the user attempts to log in to the system, the login interface can require that the user provide an answer to one of the previous questions, in addition to other login credentials such as the username and password. When a system is being accessed for the first time from a particular device (e.g., smartphone or desktop computer), there may be an additional verification required, such as entering a security code generated in real-time that is then sent to the user via known methods of communication like an email or a text message.

Authentication controls are often used in conjunction with programs designed to distinguish humans from machines (bots), typically as a way of thwarting spam and automated extraction of data. These programs can be implemented as a third party service, such as reCAPTCHA, which ask a user to identify which of certain images contain particular objects.

Another form of a password for accessing devices using a touch screen is a pattern swipe. The display on the touch screen can be provided with some coordinate system or other frame of reference (like a row-and-column arrangement of dots), and the user moves their finger across the touch screen in a known pattern such as a Z-shape. If the user performs the correct swipe operation, i.e., the one previously entered by the same user during the security setup, then access to the device is granted.

Another authentication technique for state-of-the-art systems involves the use of biometrics. Biometrics are physical measurements of human characteristics that can be used to identify a person. Examples of biometric identifiers are fingerprints, retinal scans, facial patterns, and voice or typing cadence. These traits have features that can be quantified, such as whorls, loops and arches in the case of fingerprints and, as a practical matter, are uniquely associated with an individual.

SUMMARY OF THE INVENTION

The present invention in at least one embodiment is generally directed to a method of authenticating a user who wants access to an electronic resource by receiving an access request from the user to access the electronic resource wherein the access request includes an identification of the user, presenting a drawing challenge to the user which instructs the user to draw a particular reference shape, receiving an electronic drawing image from the user in response to the drawing challenge, retrieving an historical drawing capability associated with the user identification, and comparing the electronic drawing image to the historical drawing capability to determine whether to authenticate the user. If the electronic drawing image matches the historical drawing capability then access for the electronic resource is granted to the user, and if the electronic drawing image does not match the historical drawing capability then access for the electronic resource is denied. The comparing can be performed using a machine-learning classifier trained with one or more previous drawings of the reference shape by the user. In the preferred embodiment, the classifier is a generative adversarial network. The classifier can be trained by generating one or more machine samples of the reference shape based on a latent sample, and computing positive discrimination vectors based on the one or more previous drawings of the reference shape by the user and the one or more machine samples of the reference shape, and the comparing includes generating an image vector from the electronic drawing image, and determining if the image vector is within the positive discrimination vectors. The historical drawing capability can be retrieved from a user drawing capability bank having a plurality of historical drawing capabilities for different users.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

While modern authentication systems can be very effective at securing access to electronic resources, they are still subject to a variety of problems, among them hacking, that is, using illicit means to gain unauthorized access, or exploits such as using "back doors" that allow covert entry into systems. Moreover, all of the existing authentication mechanisms are based on the assumption that the passcode or user biometrics is not compromised, so malicious actors can spend a great amount of time trying to uncover such authentication credentials. For example, in the case of a touch screen swipe pattern, someone can just look over a user's shoulders to see the general outline that the user is making with their finger swipe and thereby instantly gain access to that device. Currently there are no existing authentication mechanisms which can provide supplementary protection using other characteristics of a person that are less susceptible to prying.

It would, therefore, be desirable to devise an improved method of authentication that could rely on a soft personal trait of a user, that is, an intangible quality that is not subject to direct measurement like a biometric. It would be further advantageous if the method could offer resistance to hacking by making it impractical to obtain a user credential just from breaking in to a secure system that maintains the credential-related information. These and other advantages are achieved in various implementations of the present invention by using personal drawing capability as a credential. In certain embodiments, the invention begins with a training module of a data processing system which can learn a person's drawing capability. This training module works based on drawing shapes offered to a person, and the shapes that the person draws in response to drawing challenges. The challenge can consist of presenting random words for shapes such as "flower" or "rectangle", etc., to the user. This set of shapes is finite but can be extended based on system capacity to include a fairly large number. In the illustrative implementation, the user drawings are analyzed by a generative adversarial network (GAN) which is able to predict how a person will draw a shape based on the training. The system can thus distinguish between person A and person B when examining a drawing submission, such as a flower shape. In this manner, the person's drawing capability itself becomes a password or credential. Relying on a person's drawing capability is particularly advantageous since it is an intangible quality that no one can steal or otherwise acquire. Moreover, by using a GAN to generate discrimination vectors for a user's drawing samples, the system frustrates hacking since the vectors themselves (which are stored in the secure system) cannot be used to reverse engineer what particular shape the vectors relate to.

Figure 1:
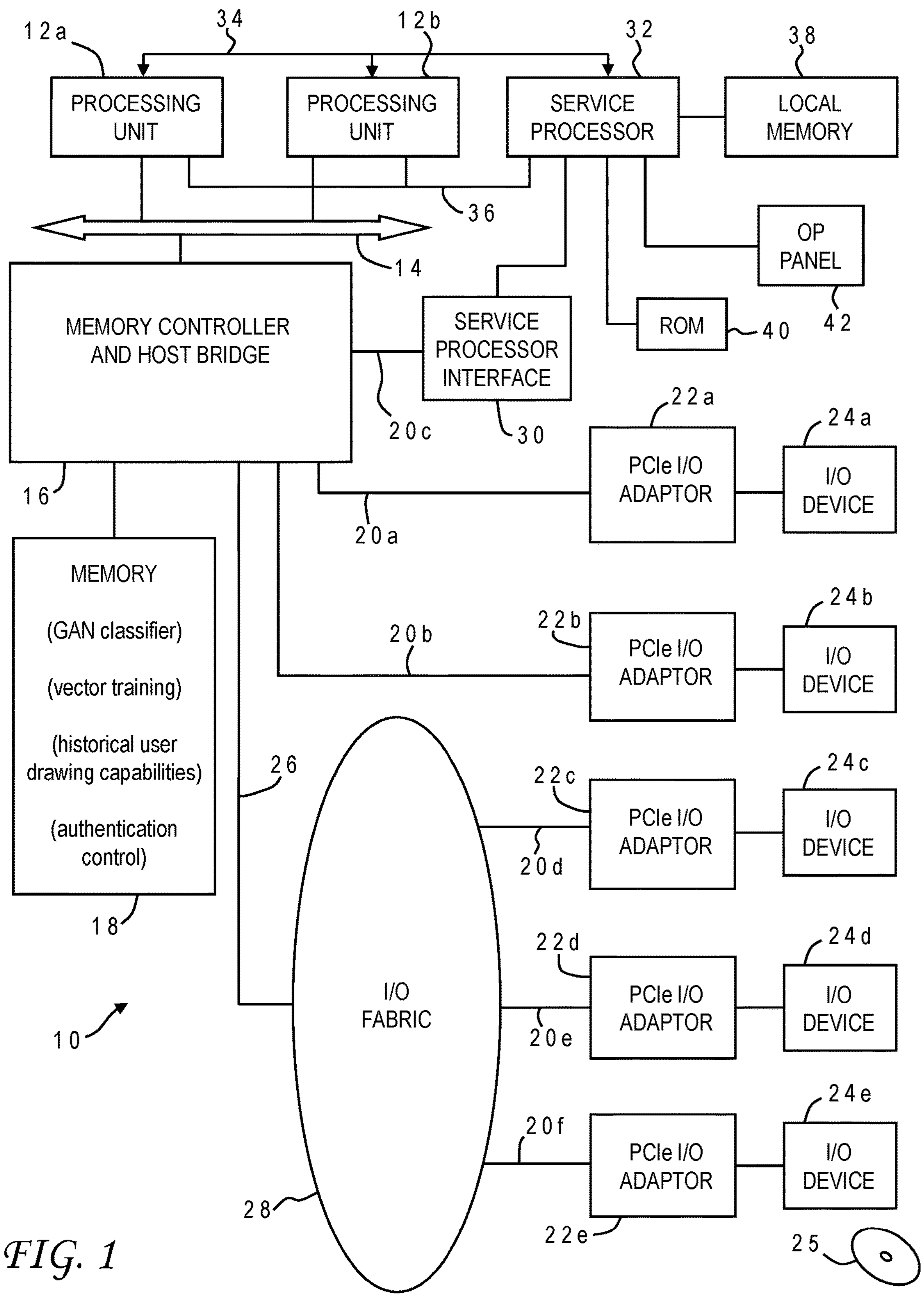
FIG. 1 is a block diagram of a computer system programmed to carry out the training of a generative adversarial network (GAN) acting as a classifier and use of that classifier to authenticate a user based on drawing capabilities in accordance with one implementation of the present invention.

With reference now to the figures, and in particular with reference to FIG. 1, there is depicted one embodiment 10 of a computer system in which the present invention may be implemented to carry out the training and use of an authentication system based on user drawing capabilities. Computer system 10 is a symmetric multiprocessor (SMP) system having a plurality of processors 12*a*, 12*b* connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention, including a GAN, a vector training module, a bank of historical user drawing capabilities, and an authentication control module.

MC/HB 16 also has an interface to peripheral component interconnect (PCI) Express links 20*a*, 20*b*, 20*c*. Each PCI Express (PCIe) link 20*a*, 20*b* is connected to a respective PCIe adaptor 22*a*, 22*b*, and each PCIe adaptor 22*a*, 22*b* is connected to a respective input/output (I/O) device 24*a*, 24*b*. MC/HB 16 may additionally have an interface to an I/O bus 26 which is connected to a switch (I/O fabric) 28. Switch 28 provides a fan-out for the I/O bus to a plurality of PCI links 20*d*, 20*e*, 20*f*. These PCI links are connected to more PCIe adaptors 22*c*, 22*d*, 22*e* which in turn support more I/O devices 24*c*, 24*d*, 24*e*. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12*a*, 12*b* may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20*c* connects MC/HB 16 to a service processor interface 30 to allow communications between I/O device 24*a* and a service processor 32. Service processor 32 is connected to processors 12*a*, 12*b* via a JTAG interface 34, and uses an attention line 36 which interrupts the operation of processors 12*a*, 12*b*. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12_a_, 12_b_ and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12_a_, 12_b_ for execution of the program code, e.g., an operating system (OS) which is used to launch applications and in particular the drawing capability authentication system of the present invention, results of which may be stored in a hard disk drive of the system (an I/O device 24). While host processors 12_a_, 12_b_ are executing program code, service processor 32 may enter a mode of monitoring and reporting any operating parameters or errors, such as the cooling fan speed and operation, thermal sensors, power supply regulators, and recoverable and non-recoverable errors reported by any of processors 12_a_, 12_b_, memory 18, and MC/HB 16. Service processor 32 may take further action based on the type of errors or defined thresholds.

The present invention may be a system, a method, and/or a computer program product. The computer program product may include one or more computer readable storage media collectively having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for an authentication process that uses novel analytical techniques to manage access to electronic resources. Accordingly, a program embodying the invention may additionally include conventional aspects of various authentication and security tools, and these details will become apparent to those skilled in the art upon reference to this disclosure.

Figure 2:
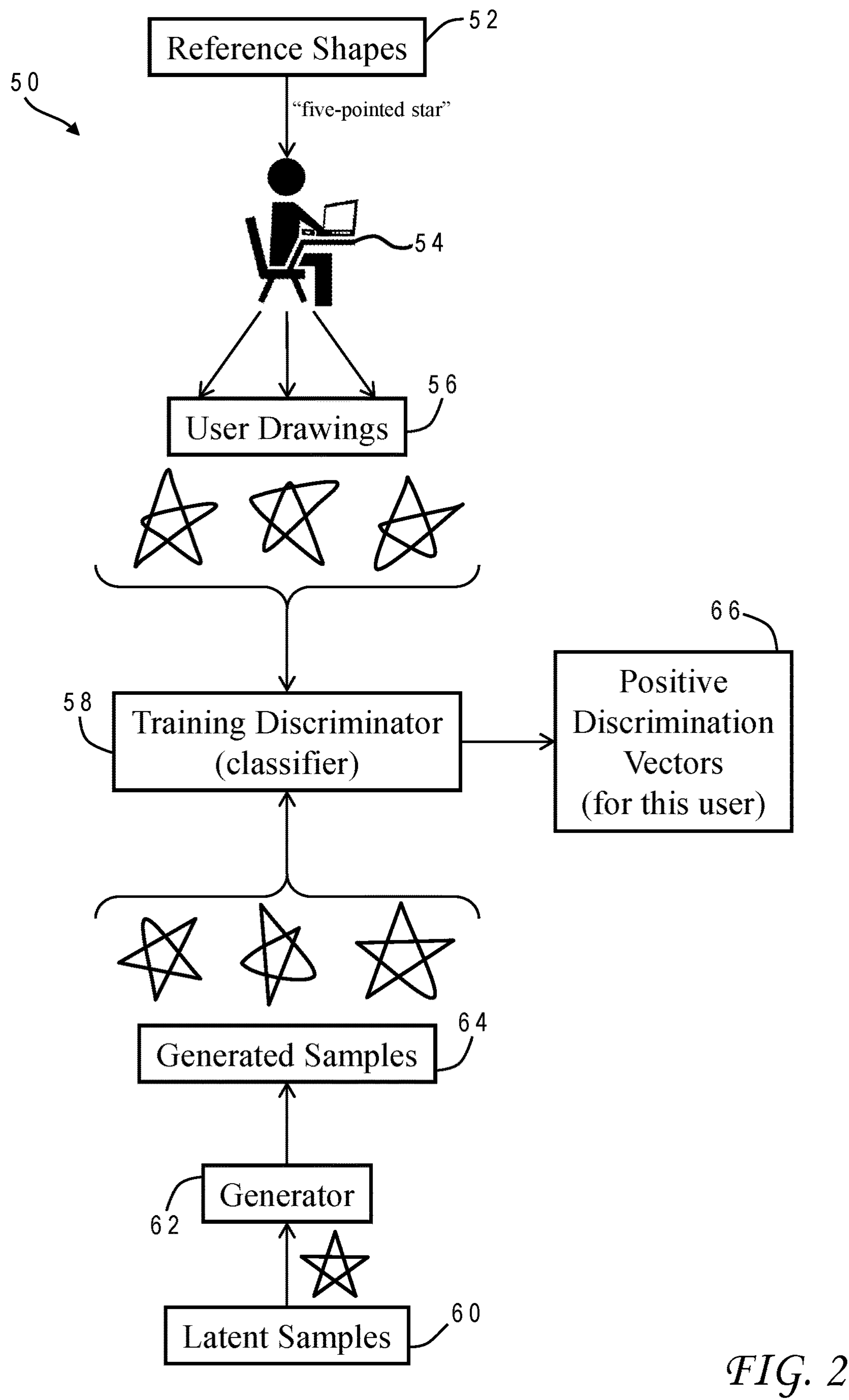
FIG. 2 is a pictorial representation of the training of a GAN using discrimination vectors which are generated based on a user's training drawings and machine-generated samples in accordance with one implementation of the present invention.

Referring now to FIG. 2, there is depicted a training environment 50 for a GAN classifier which uses discrimination vectors that are based on a user's training drawing inputs and machine-generated samples in accordance with one implementation of the present invention. A GAN is a class of machine learning frameworks that includes a generator and a discriminator. Both the generator and the discriminator can be neural networks. The discriminator in a GAN is basically a classifier. Classifiers are used in artificial intelligence (cognitive) systems to identify an input. The classification scheme is typically binary, i.e., a yes/no determination as to whether the inputs to the classifier constitute a particular type of output. In the context of the present invention, the GAN classifier is used to determine whether a current drawing input matches a historical drawing capability for a particular user.

Training environment 50 may be carried out using any computing device, such as computer system 10 of FIG. 1. The system has preprogrammed therein a list 52 of various reference shapes. The reference shapes could have practically any form, but should be more than a simple line or curve. Reference shapes might include regular polygons (square, hexagon, etc.), irregular polygons, or curved shapes (circles, ovals, ellipses), but a reference shape does not have to be a closed shape (i.e., with an inside and outside). A reference shape could also be a combination of two or more shapes, in a particular arrangement, or could be a special shape that is not geometric, e.g., a face shape including a facial outline, eyes and mouth. The shapes are preferably those that are generally known, although more advanced systems could use obscure shapes such as a *triquetra* (trefoil knot).

During the training stage, a user 54 will be prompted to draw one of the reference shapes, i.e., the system can output a text line of the shape to the user via an output device of the computer system. While list 52 is textual in the illustrative implementation, the system could alternatively prompt the user by presenting an exemplary image for the particular shape under consideration. If the user does not want to draw a particular image, they can request a different shape. In the example of FIG. 2, the system has prompted the user to draw a five-pointed star. User 54 accordingly draws one or more images 56 for a five-pointed star. More user drawings increases the accuracy of the classifier. The images may be drawn by any convenient means, such as using a fingertip on a touch-screen, or via a stylus writing on an electronic tablet, any type of graphical point device (e.g., a mouse), or other standard input device. The images are stored electronically, i.e., digitized. In the illustrative implementation, the images are recorded as bitmaps.

In addition to the user-supplied drawings 56, the GAN training also relies on image samples generated automatically, i.e., by the computer system. The system can have a collection of latent sample images 60 each of which corresponds to a particular shape in list 52. Further to the example of FIG. 2, one of these latent samples 60 is a "perfect" (symmetrical) five-pointed star. A generator 62 takes a latent sample 60 and generates multiple versions of the shape in a known fashion as generated samples 64 (also bitmaps). Generated samples 64 are then fed to a training discriminator 58 along with user drawings 56, i.e., the user drawings are labeled as "authentic" while the generated samples are labeled as "not authentic". Training discriminator 58 uses this data to compute positive discrimination vectors 66 which constitute a representation of the drawing capability for this user (and this shape).

Training of discriminators for image recognition is generally known (although it has not heretofore been applied to user drawing capability); see for example the articles "GANs in computer vision: Introduction to generative learning (part 1)" by Nikolas Adaloglou (available at Internet URL https://theaisummer.com/gan-computer-vision/) and "How to Develop a 1D Generative Adversarial Network From Scratch in Keras" by Jason Brownlee (available at Internet URL https://machinelearningmastery.com/how-to-develop-a-generative-adversarial-network-for-a-1-dimensional-function-from-scratch-in-keras/). A discriminator as used in the present invention is essentially a classifier such as a neural network which has a scalar output between zero and one. Weights of the neural network are computed to drive the output of the discriminator toward a "0" value (not authentic) for generated samples 64 and to drive the output toward a "1" value (authentic) for user drawings 56. For such an implementation, positive discrimination vectors 66 are embodied in the weights of the neural network. Positive discrimination vectors 66 then become the basis for later authentication of this user.

Figure 3:
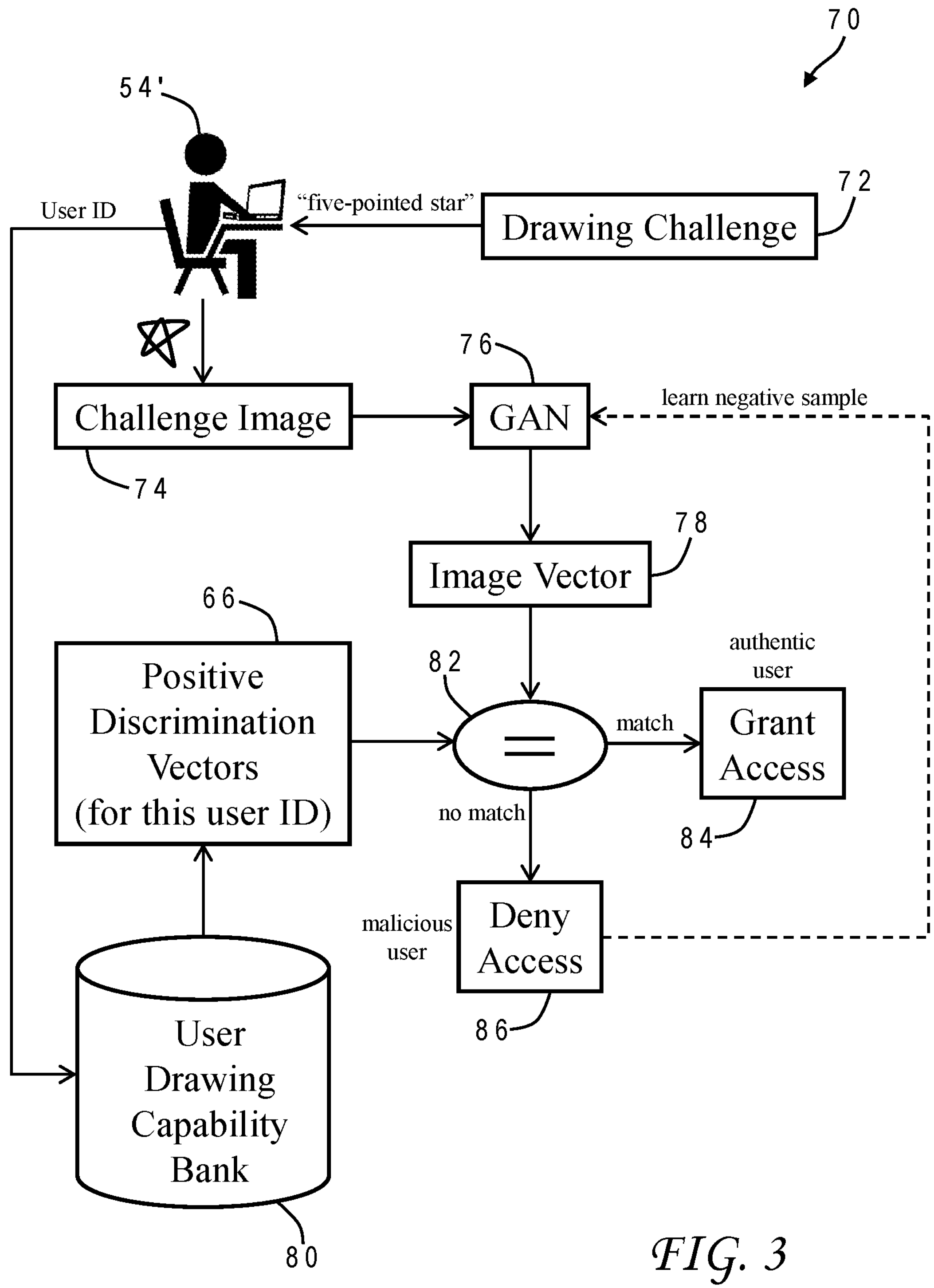
FIG. 3 is a pictorial representation of a drawing challenge that is presented to an actor which is used to authenticate the actor based on a challenge image drawn by the actor and analyzed by a GAN in accordance with one implementation of the present invention.

FIG. 3 shows such later authentication based on user drawing capability in accordance with one implementation of the present invention. An authentication system 70 is used to validate an actor 54' who has submitted a user ID to the system in order to obtain access to electronic resources. Authentication system 70 can be managed by the same computer system used for the GAN training, or on a different computer system, including a remote system such as a cloud operator which houses historical drawing capabilities for multiple users wanting access to the particular resource at hand. The resource being accessed may reside on a system that is separate from the one supporting authentication system 70. In some cases, the user discrimination vectors can be generated on one system, and then downloaded to another system for local use. For example, a user could install personalized trained vectors on a smartphone and use them to provide secure access to the smartphone.

Authentication system 70 presents one or more drawing challenges 72 to actor 54'. The may be in lieu of a password or similar authentication, or in addition to such other authentication measures, especially for highly-sensitive resources. The drawing challenge asks actor 54' to draw a particular shape. In the illustrative embodiment the drawing challenge is presented as a text description to actor 54', i.e., a word or phrase, but it again could be presented in other ways such as by showing an image of the shape, or using an audio output that says the shape aloud. If the user had chosen to previously ignore the particular shape of this drawing challenge during the training phase (perhaps because of its complexity), they may request that the system repeat the challenge with a different shape. Actor 54' then draws a challenge image 74, which is submitted to a GAN 76. GAN 76 generates an image vector 78 for challenge image 74. GAN 76 advantageously converts the image to a vector in a manner that allows prediction of any input from the same user with reasonable accuracy. The particular procedure used should be the same as that employed for the vectorization of the user drawings and generated samples used in the training of FIG. 2. The use of a GAN for this purpose also reduces the need for comprehensive training in terms of generating more samples. The system can thereby develop an expertise in identifying the difference between, say, a flower drawn by person A and the same type of flower drawn by person B. As a further benefit, the discrimination vectors cannot be reversed engineered back to what a user has drawn. Accordingly, even if the GAN is hacked or otherwise compromised, no one can identify which vectors are applicable for a particular shape associated with a user. Use of a GAN is additionally advantageous in that the efficiency of the process keeps increasing with each iteration being an indirect training.

Authentication system 70 can concurrently access a user drawing capability bank 80 and extract the positive discrimination vectors 66 that are associated with the user ID entered by actor 54'. Image vector 78 and positive discrimination vectors 66 are input to a classifier 82 to see whether image vector 78 falls within positive discrimination vectors 66. Classifier 82 has the same architecture as the training discriminator of FIG. 2. If image vector 78 does match the positive discrimination vectors, actor 54' is deemed an authentic user and access to the resource is granted 84. If image vector 78 does not match positive discrimination vectors 66, the system can assume actor 54' is malicious, and access is denied 86. There are various conventional approaches to interpreting the output of a discriminator. In the simplest implementation, the output represents a probability between zero and one, so a positive match can be presumed if the probability is greater than 50%, i.e., if the output value of the discriminator is greater than 0.5. A higher value can be used for greater confidence.

In some implementations the accuracy of the authentication mechanism can vary depending on the number of challenges presented, i.e., an actor might be presented with three different drawing challenges, and as long as at least two of the challenges are successful, the access can be granted. Additionally, two different confidence thresholds could be considered (i.e., for comparison to the discriminator output value), a higher one required to grant access, and a lower one to actually classify the actor as malicious.

In some implementations the system can also use non-matching drawing inputs to learn about malicious actors and optimize banning those actors. Thus, if a certain actor has reached N number of failed attempts to access the system by submitting different drawing challenge images, those images can be fed as negative samples to GAN 76. Thereafter, the system can preemptively identify that actor as malicious with a single drawing input based on this pattern matching, and take corresponding action.

It should be understood that the term "drawing capability" as used herein does not necessarily mean good or bad ability from an artistic perspective. Rather, the capability is more a reflection of a particular style or trait of the person's drawings as embodied in the discrimination vectors.

Figure 4:
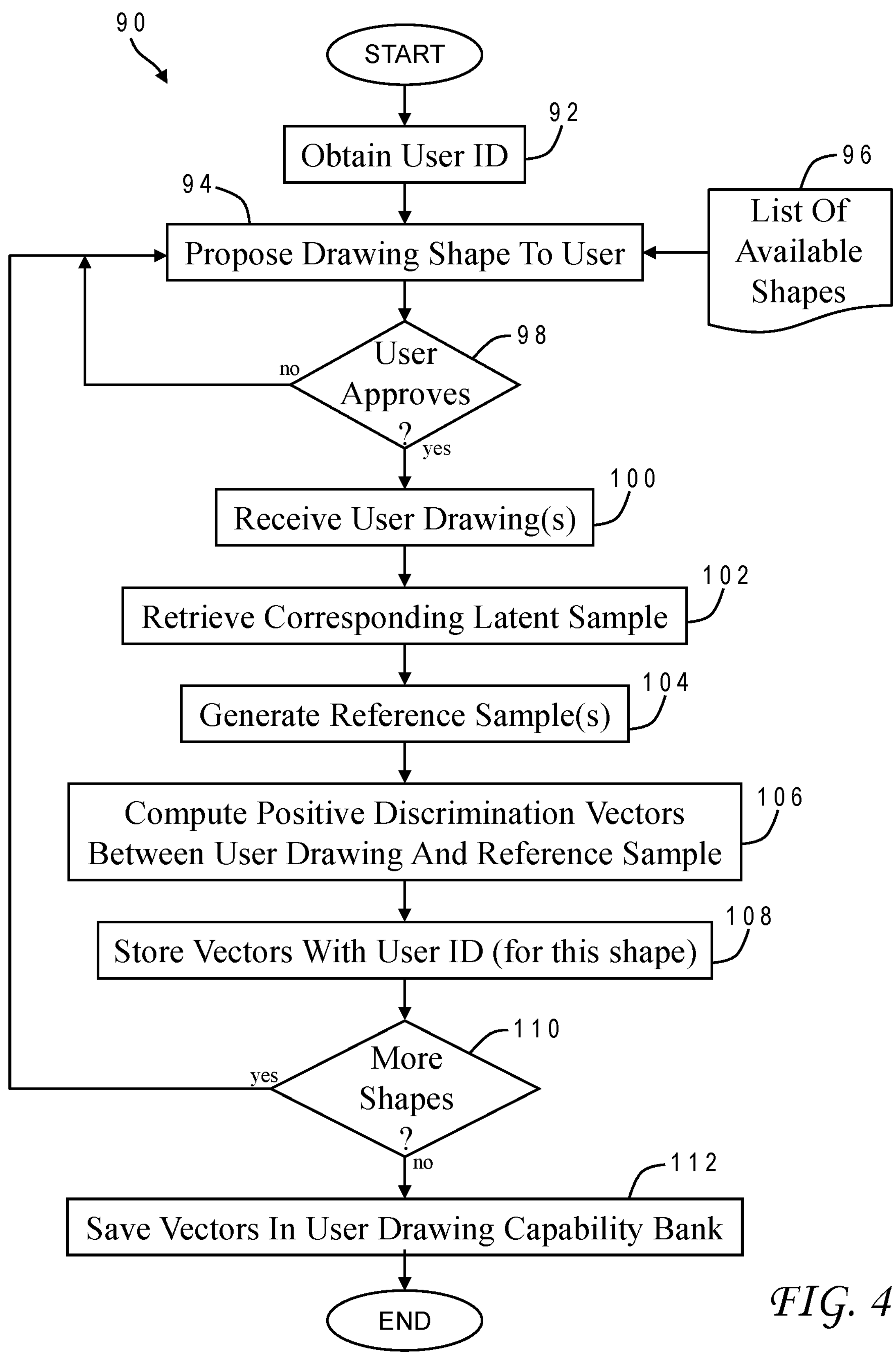
FIG. 4 is a chart illustrating the logical flow for a training process which computes discrimination vectors based on drawings from a user in accordance with one implementation of the present invention.

The present invention may be further understood with reference to FIG. 4 which is a chart illustrating the logical flow for a training process 90 that computes discrimination vectors based on drawings from a known user in accordance with one implementation of the present invention. Process 90 begins by obtaining a user ID (or username) for this user 92. This may be accomplished by assigning the user an existing ID already in use by this user for related resources, or by prompting the user to enter a new ID. The user ID should be unique to this user for resources controlled by this authentication mechanism. A drawing shape is then proposed to the user 94. The drawing shape is taken from a list of available shapes 96. The list should include only those shapes for which generated (machine) samples will also be available for training. The user can approve or decline this offer 98. If the user declines to draw the current shape, the process returns iteratively to box 94 and another shape is presented. If the user approves of the shape, they submit one or more drawings 100. The system retrieves a latent sample corresponding to the selected shape 102, and generates one or more reference samples 104. The positive discrimination vectors are then computed based on the user drawings and reference samples 106, and the vectors for this shape are stored in association with this user 108. If training for other shapes is desired 110, the process repeats iteratively at box 94. In some implementations the user is allowed to enter any number of drawing shapes for training (subject to the finite number of shapes available in list 96), while in other implementations the system will simply require a minimum number of different shapes. Once a sufficient number of vector sets for different drawing shapes have been completed, all of the vectors for the different shapes are saved for this user in the user drawing capability bank 112.

Figure 5:
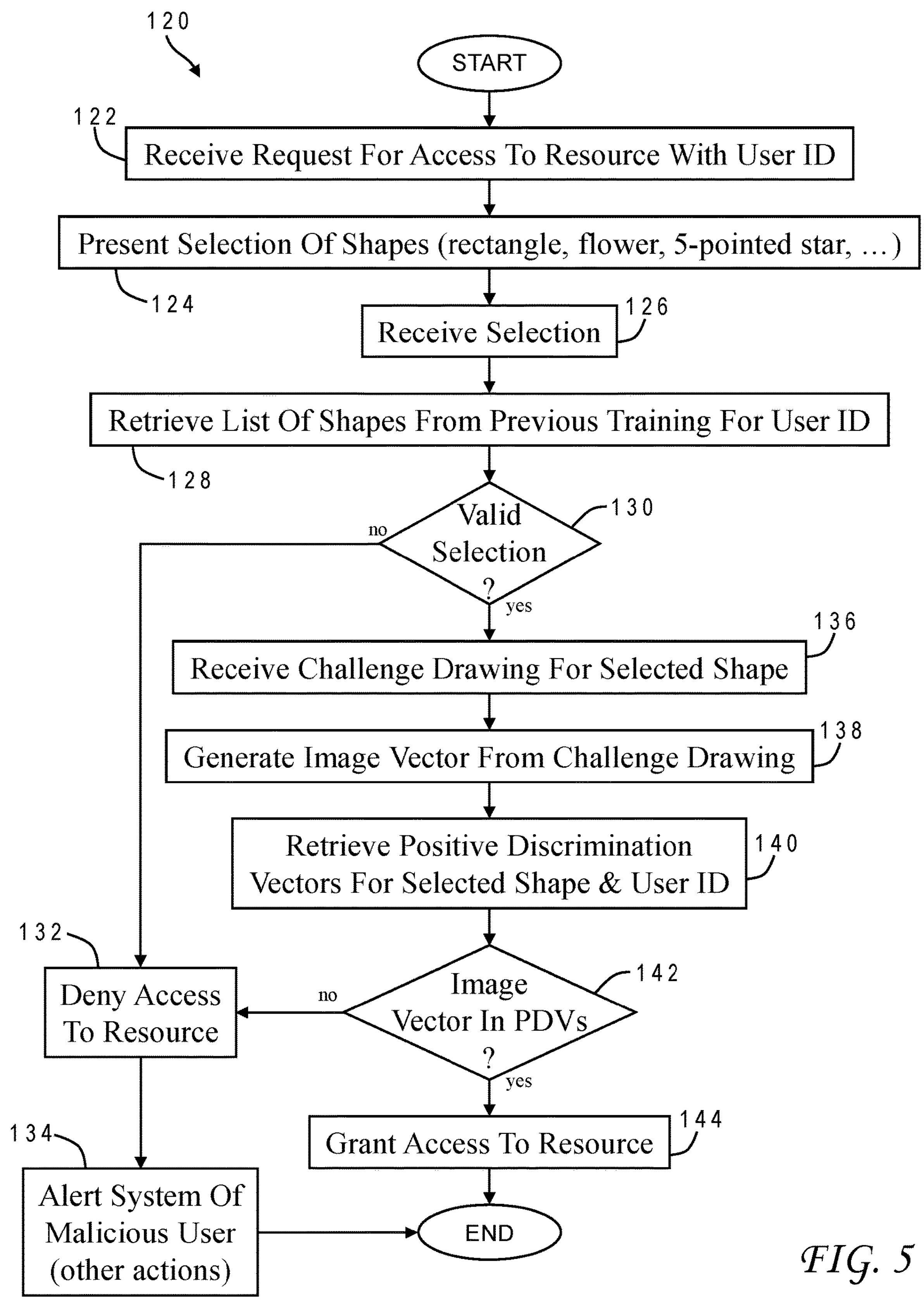
FIG. 5 is a chart illustrating the logical flow for an authentication process which compares a current challenge drawing to historical user drawing capability using the discrimination vectors in accordance with one implementation of the present invention.

FIG. 5 is a chart illustrating the logical flow for an authentication process 120 to be carried out after the GAN training of FIG. 4 in accordance with one implementation of the present invention. Process 120 begins with a request for access to an electronic resource 122. The request may for example be part of a login process to an electronic system such as an online account, or a button function that initiates an unlock procedure for a mobile computing device. The request includes a user ID or some other means of indicating a unique identity for a user. In the case of an account login the user ID may be entered in a text field of a login window. In the case of a mobile computing device (such as a smartphone) the user ID may be a default ID associated with the owner of the device, or an administrator account. In addition to resources such as computing systems and electronic devices, the invention can also be applied to other objects such as electronic documents, for example, a database where certain documents in the database have access restrictions. Those skilled in the art will accordingly appreciate that the present invention is not limited to any particular type of resource.

Upon receiving the request, the user (or malicious actor) is presented with a selection of possible shapes for a drawing challenge 124. In some embodiments, these shapes are limited to those which were previously used in training for this user ID, i.e., for which the user has previously input various drawing images. In alternative embodiments, the possible shapes include additional shapes, i.e., that were not the subject of previous user input, which can be used as an initial screening in the authentication process. The system receives the selected drawing challenge from the user 126, and retrieves a list of shapes that were used in previous training for this user ID 128. The list can be retrieved without receiving the discrimination vectors for this user ID. The list can then be compared to the selection 130. If the selection is for a shape that was not the subject of any earlier training for this user, it may be considered an indication that the actor is not authentic. For such an implementation, authentic users can be warned in advance that they must make a proper selection from the list or else it will trigger an invalid authentication, so a user will need to remember the shapes that have been previously drawn or have a separate record of it. If the shape selection is invalid, access to the resource is denied 132, and the system can be alerted of a potentially malicious user 134, e.g., via a message to a supervisor, or take other actions.

If the shape selection for the drawing challenge is valid, the system receives an image of the selected shape as drawn by the user 136. This challenge drawing is used to generate an image vector 138. The image vector can be generated using a GAN. The system then retrieves the positive discrimination vectors from a bank that are assigned to this user ID 140, and compares the image vector to the positive discrimination vectors 142. If the image vector is not within the positive discrimination vectors, the process moves to box 132 to deny access and take other action. If the image vector is within the positive discrimination vectors, access to the resource is granted 144.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of authenticating a user who requests access to an electronic resource, the method comprising:

prompting the user to select a set of shapes and to produce five electronic drawing images for each shape of the selected set of shapes;

receiving the selected set of shapes and the five electronic drawing images from the user;

training a set of user specific positive discrimination vectors for each shape of the selected set of shapes based on the five electronic drawing images, wherein training further comprises comparing the five electronic drawing images to a set of computer generated sample images for each shape of the selected set of shapes;

in response to receiving an access request from the user to access the electronic resource, presenting a drawing challenge to the user, wherein the drawing challenge instructs the user to draw a particular reference shape, wherein the particular reference shape is one of the selected set of shapes;

in response to the drawing challenge, receiving an electronic representation of the particular reference shape from the user;

generating an image vector from the received electronic representation of the particular reference shape;

authenticating the user by comparing the generated image vector with the user specific positive discrimination vectors for the particular reference shape; and in response to the authentication producing a positive result, granting the user access to the electronic resource.

2. The method of claim 1, wherein the authenticating is performed using a machine-learning classifier trained with the five electronic drawings images of each shape of the selected set of shapes from the user.

3. The method of claim 2, wherein the classifier is a discriminator of a generative and adversarial network.

4. The method of claim 1, wherein the user specific positive discrimination vectors for each of the selected set of shapes are retrieved from a storage bank, wherein the storage bank comprises a plurality of user specific positive discrimination vectors.

5. The method of claim 1, wherein the positive result identifies a probably greater than fifty percent that the drawing challenge response was drawn by the user.

6. The method of claim 1, further comprising:

in response to the authentication producing a negative result, denying the user access to the electronic resource.

7. The method of claim 6, wherein the negative result identifies a probably less than fifty percent that the drawing challenge response was not drawn by from the user.

8. A computer program product for authenticating a user who requests access to an electronic resource, the computer program product comprising:

one or more computer-readable storage media and program instructions stored on the one or more computer-readable storage media, the program instructions executable by a computing system to cause the computing system to perform a method comprising:

prompting the user to select a set of shapes and to produce five electronic drawing images for each shape of the selected set of shapes;

receiving the selected set of shapes and the five electronic drawing images from the user;

training a set of user specific positive discrimination vectors for each shape of the selected set of shapes based on the five electronic drawing images, wherein training further comprises comparing the five electronic drawing images to a set of computer generated sample images for each shape of the selected set of shapes;

in response to receiving an access request from the user to access the electronic resource, presenting a drawing challenge to the user, wherein the drawing challenge instructs the user to draw a particular reference shape, wherein the particular reference shape is one of the selected set of shapes;

in response to the drawing challenge, receiving an electronic representation of the particular reference shape from the user;

generating an image vector from the received electronic representation of the particular reference shape;

authenticating the user by comparing the generated image vector with the user specific positive discrimination vectors for the particular reference shape; and in response to the authentication producing a positive result, granting the user access to the electronic resource.

9. The computer program product of claim 8, wherein the authenticating is performed using a machine-learning classifier trained with the five electronic drawings images of each shape of the selected set of shapes from the user.

10. The computer program product of claim 9, wherein the classifier is a discriminator of a generative and adversarial network.

11. The computer program product of claim 8, wherein the user specific positive discrimination vectors for each of the selected set of shapes are retrieved from a storage bank, wherein the storage bank comprises a plurality of user specific positive discrimination vectors.

12. The computer program product of claim 8, wherein the positive result identifies a probably greater than fifty percent that the drawing challenge response was drawn by the user.

13. The computer program product of claim 8, further comprising:

in response to the authentication producing a negative result, denying the user access to the electronic resource.

14. The computer program product of claim 13, wherein the negative result identifies a probably less than fifty percent that the drawing challenge response was not drawn by from the user.

15. A computer system for authenticating a user who requests access to an electronic resource, the computer system comprising:

one or more computer processors, one or more computer-readable storage media, and program instructions stored on the one or more of the computer-readable storage media for execution by at least one of the one or more processors, wherein the computer system is capable of performing a method comprising:

prompting the user to select a set of shapes and to produce five electronic drawing images for each shape of the selected set of shapes;

receiving the selected set of shapes and the five electronic drawing images from the user;

training a set of user specific positive discrimination vectors for each shape of the selected set of shapes based on the five electronic drawing images, wherein training further comprises comparing the five electronic drawing images to a set of computer generated sample images for each shape of the selected set of shapes;

in response to receiving an access request from the user to access the electronic resource, presenting a drawing challenge to the user, wherein the drawing challenge instructs the user to draw a particular reference shape, wherein the particular reference shape is one of the selected set of shapes;

in response to the drawing challenge, receiving an electronic representation of the particular reference shape from the user;

generating an image vector from the received electronic representation of the particular reference shape;

authenticating the user by comparing the generated image vector with the user specific positive discrimination vectors for the particular reference shape; and in response to the authentication producing a positive result, granting the user access to the electronic resource.

16. The computer system of claim 15, wherein the authenticating is performed using a machine-learning classifier trained with the five electronic drawings images of each shape of the selected set of shapes from the user.

17. The computer system of claim 16, wherein the classifier is a discriminator of a generative and adversarial network.

18. The computer system of claim 15, wherein the user specific positive discrimination vectors for each of the selected set of shapes are retrieved from a storage bank, wherein the storage bank comprises a plurality of user specific positive discrimination vectors.

19. The computer system of claim 15, wherein the positive result identifies a probably greater than fifty percent that the drawing challenge response was drawn by the user.

20. The computer system of claim 15, wherein in response to the authentication producing a negative result, denying the user access to the electronic resource.

* * * * *